March 18, 1969     C. J. COOK     3,433,455

SPRING BIASED VALVE

Filed Sept. 15, 1967

INVENTOR
CHARLES J. COOK

BY
*Kenneth C. Witt*

ATTORNEY

United States Patent Office 3,433,455
Patented Mar. 18, 1969

3,433,455
SPRING BIASED VALVE
Charles J. Cook, Newaygo, Mich., assignor to Clark
Equipment Company, a corporation of Delaware
Filed Sept. 15, 1967, Ser. No. 668,093
U.S. Cl. 251—321                                3 Claims
Int. Cl. F16k 15/18, 1/32

ABSTRACT OF THE DISCLOSURE

A valve having a closure member with a portion thereof normally passed against a seat member, the seat member having a circular opening through which a projection on the closure member projects and provides a seal with the edge of the circular opening in the valve closed position. A retainer member is secured to the seat member and a spring is located between the retainer member and the closure member to hold the latter normally in closed or sealing position.

Background of the invention

The present invention was conceived particularly with a view to its use in the material moving method and device disclosed and claimed in application Ser. No. 649,560 of Cyril B. Rogers which is assigned to the same assignee as the present invention. However, it is not limited to such use but it is useful also in other applications as will be apparent from the description of the invention which follows hereafter.

Summary of the invention

A valve comprising a seat member having an opening therethrough and a retainer secured to one side of the seat member. A closure member is positioned between the seat member and retainer member, with the closure member having a portion thereon projecting through the opening in the seat member and sealingly engaging the edge of the opening in the valve closed position. The closure member also normally abuts the seat member in another location, and a spring is located between the retainer member and the closure member normally to hold the closure member in the valve closed position.

Description of the preferred embodiment

Figure 2:
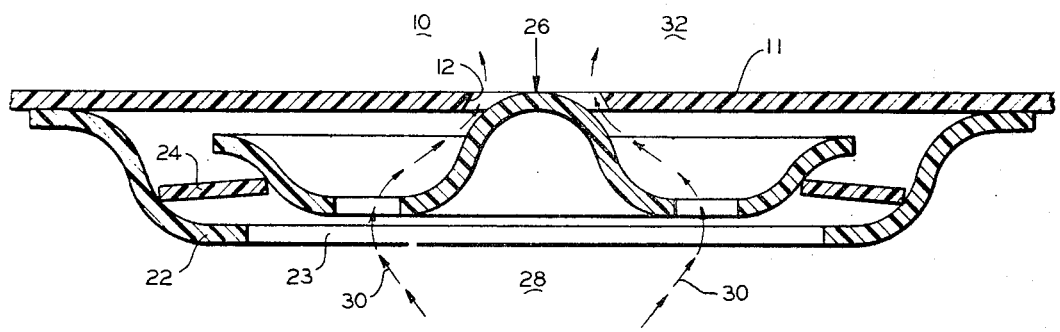
FIGURE 2 shows a cross-sectional view of the same valve in the open position.

In the drawing the numeral 10 indicates generally a valve in accordance with the present invention. The numeral 11 indicates a flat member which may be referred to as the seat member. As best seen in FIG. 2, the member 11 has a circular opening 12 therein.

The valve 10 also includes a closure member indicated by the numeral 14 which is circular in configuration. As shown in the drawing, closure member 14 has outer edge portion 16 which normally abuts the bottom surface 17 of member 11 in the valve closed position of FIG. 1. Edge portion 16 includes a reverse curve, i.e., a portion 15 which curves upwardly, and then outwardly thereof is another curved portion 19 with the center of the radius of curvature below the closure member 14. Member 14 also has an upwardly projecting central dome portion 18 which in the valve closed position of FIG. 1 engages the edge 12 of the opening in member 11 in sealing relation to prevent the passage of the medium being controlled by the valve from one side of member 11 to the other. In the form illustrated, closure member 14 also includes a plurality of openings 20, the function of which is described hereinafter.

Secured to the bottom surface of member 11, in the position illustrated in the figures of the drawing, is a circular retainer member 22. Belleville spring 24, which is a flat spring of known type, is positioned between retainer member 22 and closure member 14 in the manner shown. As is known, a Belleville spring tends to resist being pressed into a completely planar position, therefore, the spring 24 urges the closure member 14 from the position of FIG. 2 toward the position of FIG. 1.

Figure 1:
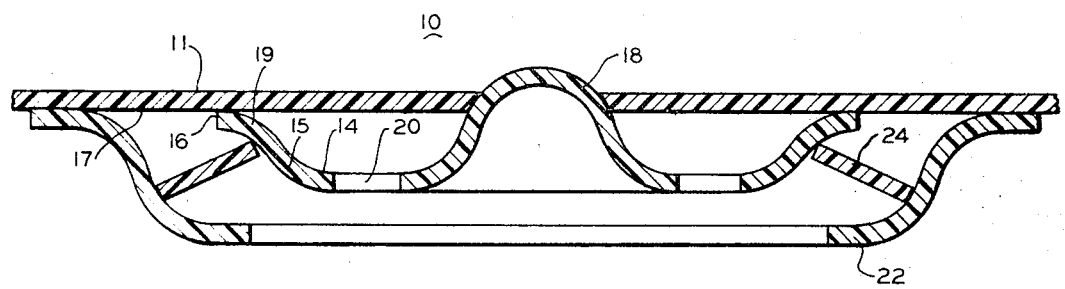
FIGURE 1 shows a cross-sectional view of a valve embodying the present invention, in the closed position.

In the position of FIG. 1 the valve 10 is closed. To open the valve pressure is applied along the line indicated by the arrow 26 in FIG. 2 on the projecting portion 18 of the closure member. This forces the closure member 14 away from edge 12 of the seat member 11. Then, if there is air or other fluid under pressure below the valve in the space indicated generally by the numeral 28 it flows along the path indicated by the dashed lines 30 through the opening 23 in the retainer member 22, through openings 20 in the closure member, and between projecting portion 18 and edge 12, and thus to the space above the valve indicated generally by the numeral 32. When pressure is removed from the projecting portion 18 of the closure member, spring 24 restores it to the position of FIG. 1 and closes the valve, thereby cutting off the flow of air or other fluid.

As indicated previously the valve disclosed herein is particularly adaptable for use in the material moving method and device of application Ser. No. 649,560. All parts of the present valve including the Belleville spring can be made of nylon or other comparable flexible material and such valves according to this invention can be used in the material moving method and device of the said application very adavntageously because the valves will in effect roll up or otherwise undergo compaction along with the remainder of the device disclosed and claimed therein, but yet perform the necessary check valve function when the device is operating for the movement of material utilizing an air film as a lubricant on the upper surface of the device.

However, the present invention is not limited to the use of "flexible" components. All of the parts may be of metal if desired and relatively non-flexible, except, of course, the Belleville spring must have the necessary resiliency characteristics to cause the operation of the valve in the manner previously described.

I claim:
1. A valve comprising a flat seat member having a circular opening therethrough, a circular closure member having a central projecting portion thereon sealingly engaging the edge of the said opening in the valve closed position, an outer portion of the said closure member also abutting one surface of the said seat member in the said valve closed position, the said closure member having at least one opening therethrough between the said central projecting portion and the said outer porion, a retainer member secured to the said one surface of the said seat member, the said retainer member having at least one opening therethrough, and a spring between the said retainer member and the said closure member normally holding the latter in the valve closed position, the said openings in the retainer member and closure member allowing the flow of fluid through the valve when the said projecting portion of the closure member is pushed away from the said seat member to the valve open position.

2. A valve as specified in claim 1 in which all the parts thereof are made of flexible material.

3. A valve as specified in claim 1 in which all the parts thereof are made of nylon.

References Cited

UNITED STATES PATENTS

| | | | |
|---|---|---|---|
| 1,784,822 | 12/1930 | Crowley | 137—540 X |
| 1,959,644 | 5/1934 | Richardson | 137—543.17 X |
| 1,993,567 | 3/1935 | Richardson | 137—543.17 X |
| 2,311,971 | 2/1943 | Shaw | 137—543.17 X |
| 2,681,752 | 6/1954 | Jarrett | 251—320 X |
| 3,244,195 | 5/1966 | Wanner | 137—543.17 |

FOREIGN PATENTS 588,004  5/1947  Great Britain.

ARNOLD ROSENTHAL, *Primary Examiner.*

U.S. Cl. X.R.

251—333, 339